M. G. KOPF.
TEMPERATURE INDICATOR.
APPLICATION FILED MAR. 19, 1915.
1,256,331. Patented Feb. 12, 1918.
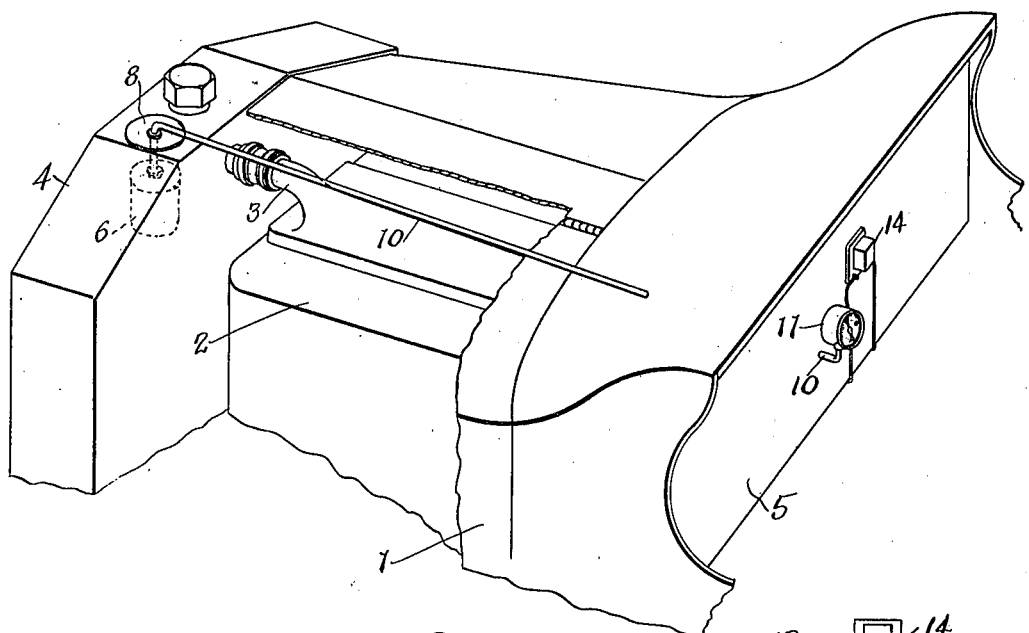
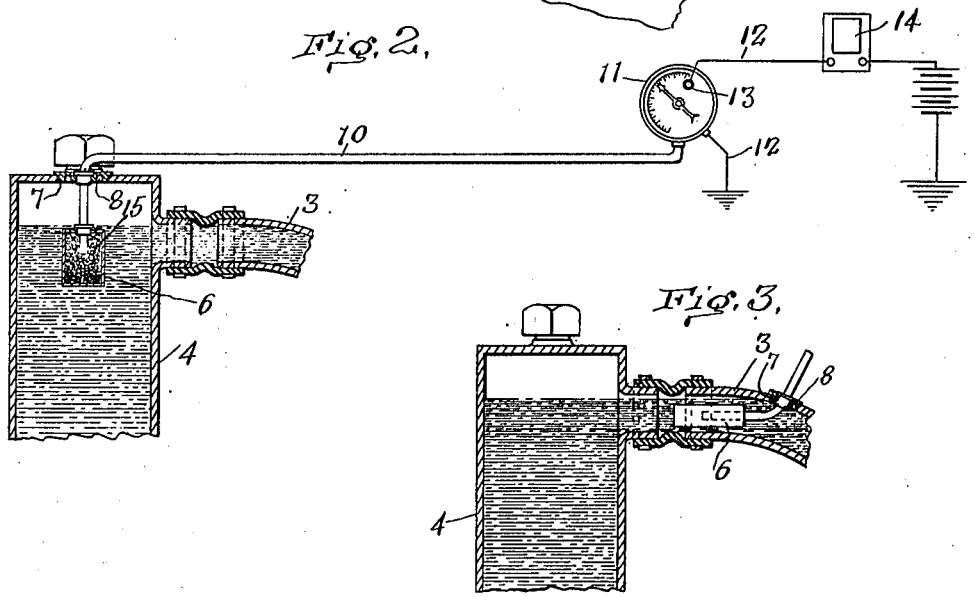
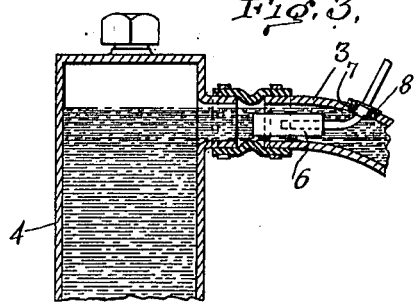
Inventor
Melrose G. Kopf,

# UNITED STATES PATENT OFFICE.

MELROSE G. KOPF, OF DAYTON, OHIO, ASSIGNOR, BY MESNE ASSIGNMENTS, TO THE McCORMICK LABORATORIES COMPANY, OF DAYTON, OHIO, A CORPORATION.

TEMPERATURE-INDICATOR.

1,256,331.       Specification of Letters Patent.     Patented Feb. 12, 1918.

Application filed March 19, 1915. Serial No. 15,587.

*To all whom it may concern:*

Be it known that I, MELROSE G. KOPF, a citizen of the United States, residing at Dayton, in the county of Montgomery and State of Ohio, have invented certain new and useful Improvements in Temperature-Indicators, of which the following is a specification, reference being had therein to the accompanying drawing.

This invention relates to temperature indicators for circulation systems of automobiles having water cooled engines. Indicators heretofore provided for this purpose have, for the most part at least, been mounted on the radiator, thus placing the gage or indicator at a point several feet removed from the driver. As a result it is very difficult to read the gage when on a dusty road, at night, or when the automobile is moving at a high rate of speed.

The object of the invention is to provide a device of this kind which may be mounted in the circulation system and will indicate the temperature to the driver by means of a gage on the instrument board of the automobile; and which will indicate the fall of the water in the system below the danger point. To this end, it is a further object of the invention to provide means for subjecting a volatile fluid to the heat in the circulation system and indicating the expansion of this fluid on a gage on the instrument board. It is also an object of the invention to provide a container for such a fluid of such a character that it will prevent the fluid, when in liquid form, from entering the conduit leading to the gage; to provide means for exposing large surfaces of the fluid to the heat to facilitate vaporization; and to provide a signal to attract attention to the gage when the temperature reaches a predetermined point.

In the accompanying drawings, Figure 1 is a perspective view of the forward portion of an automobile, partially broken away, showing my invention applied thereto; Fig. 2 is a sectional view taken through the radiator and the container and showing the indicator in elevation and the signal circuit in diagram; and Fig. 3 is a sectional detail view showing the manner of mounting the container in the circulation system.

In carrying out my invention I provide means for supporting in the circulation system, at any point where it will be subjected to the heat of the water in the system, a container having therein a volatile fluid, such, for example, as alcohol, ether, acetone or the like, and for connecting this container with a pressure gage mounted on a suitable support adjacent to the driver's seat, such as the dash or instrument board.

In the accompanying drawings I have illustrated so much of an automobile as is necessary to an understanding of the invention. The main frame of the machine is indicated at 1 and has mounted thereon the usual explosive engine 2, the water jackets of which are connected by means of an outlet manifold 3 with a radiator 4, the water jackets, manifold and radiator forming part of the well known circulation system employed for cooling the engine. The remainder of the system having no bearing on the present invention is not illustrated. The instrument board 5 is arranged in the usual position above the dash. In the present embodiment of the invention the volatile fluid is contained within a small metallic container 6 which is adapted to be inserted in the circulation system at any suitable point, preferably either in the manifold or conduit connecting the water jacket with the radiator, or in the radiator itself. In the present instance I have shown the container as mounted in the radiator. Further, as here shown, the container is supported below the normal water level in the radiator so that it is normally submerged. The term "normal" water level is herein used as indicating a level above which the water is usually maintained, and below which it is dangerous to permit the water to fall. While I prefer this arrangement of the container it is not essential to the operation of the indicator but the container may be mounted above the normal water level and still provide a more or less satisfactory indication of the temperature of the water. The container may be mounted in the system in any suitable manner but, as here shown, this is preferably accomplished by tapping the top wall of the radiator, as shown at 7, inserting the container through the opening thus formed and then closing the opening by means of a plug 8 which may be screw-threaded or otherwise secured in place and which is provided with an opening through which extends a conduit, such as a copper tube 10, which is led to the instrument board 5 and connected with a gage 11, which may be an ordinary pressure gage and the details of which it is not necessary to here illustrate. The volatile fluid which is within the container will, of course, at low temperatures be completely condensed and in liquid form. As the temperature rises the fluid vaporizes and passes through the conduit to the pressure gage and as the temperature continues to rise the vaporization and expansion of the fluid increases and additional pressure is exerted upon the gage. The gage may be calibrated to read either in pounds, of pressure, or in degrees of temperature. It will be apparent, therefore, that the gage on the instrument board, which is so arranged that it is always readable by the driver, will indicate at all times the exact temperature of the water in the circulation system. The continuance of this temperature at an abnormally high degree is a warning which will be noted at once by the driver. Where the container is normally submerged in the water the movement of the needle of the gage will be comparatively steady and there will be little tendency to sudden vibration. However, if the water in the circulation system falls below the container so that the latter is acted upon only by the steam and hot air contained within the system, then the needle will vibrate violently, because of the sudden changes of temperature to which the container is subjected, due to the movements of the steam and air through the system. Such a violent vibration of the gage needle will indicate to the driver that the water in the circulation system has fallen below the danger point.

If desired the indicator may be rendered still more sensitive and caused to act even more quickly than it otherwise would do by placing in the container an absorbent substance 15, such as cotton waste, which will absorb the fluid and thus distribute it over a considerable surface and expose this entire surface to the action of the heat, thereby materially facilitating the vaporization of the fluid. This absorbent also serves to a greater or less extent to prevent the fluid from entering the conduit, but I prefer to provide additional means for this purpose which may be used either with or without the absorbent substance. To accomplish this I have caused the end of the conduit or copper tube 10 to project for some distance into the container and have spaced this inwardly projecting portion of the tube away from the walls of the container. The quantity of fluid within the container is such that it will be impossible for it to enter the end of the conduit because it will not rise to the level of the end of the tube in any position in which the container may be placed. This is an important feature in the practical application of the invention because it is highly desirable that the indicator as a whole should be completed and tested before shipping the same from the factory. During shipment or installation the container is liable to be placed in any position and if the fluid enters the tube it is very liable to affect seriously the accuracy of the reading of the indicator. I have also provided the device with a signal which will call the attention of the driver to the indicator when the temperature rises to the danger point. This signal is preferably electrically operated and may be either a visual or an audible signal, such as the lighting of a lamp or the sounding of a buzzer. The operation of the signal may be caused in any suitable manner, such as connecting one side of the signal circuit, which is indicated at 12, with the casing and needle of the pressure gage and providing the pressure gage with an insulated contact 13 which is connected with the other side of the circuit 12, this contact being so arranged that when the temperature rises to the danger point, the needle will engage the contact and close the circuit through the signal, which is here shown, at 14, as a buzzer.

While I have shown and described one embodiment of the invention it will be understood that this has been chosen for the purposes of illustration only, and that I do not desire to be limited to the details of construction shown and described, for obvious modifications will occur to a person skilled in the art. Further, it will be understood that the instrument board will find its equivalent in any part of the automobile, close to the driver's seat, on which the gage may be mounted; and further that the size of the container 6 will vary under different circumstances and with different fluids. This container, however, will ordinarily be quite small and has, for the sake of clearness, been shown in the drawings as of an exaggerated size.

Having thus fully described my invention, what I claim as new and desire to secure by Letters Patent, is:—

1. The combination with an engine and a water circulation system to cool the same, of a container arranged in said circulation system to contact with the water and vapor therein and containing an expansible fluid, a gage mounted at a point remote from said container, a conduit connecting said gage with said container, said gage having means controlled by the fluid in said container to indicate the temperature of the water in said circulation system and to also indicate when the water in said system falls below a predetermined level.

2. The combination with an engine and a water circulation system to cool the same, of a gage, a container for a volatile fluid mounted in said circulation system, and a conduit connecting said container and said gage, said container being so arranged in said system that when the water falls below a predetermined level the fluctuations of the fluid in said system will subject said container to sudden changes of temperature and cause said gage to indicate the low level of the water in said circulation system.

3. The combination with an engine and a water circulation system to cool the same, of a container mounted in said circulation system and containing a volatile fluid, a pressure gage mounted at a point remote from said container, and a conduit connecting said container and said gage to cause expansion and contraction of the fluid to be indicated on the latter, and said container being arranged below the normal level of the water in said system to subject said gage to gradually changing pressures when said water is at its normal level and to suddenly changing pressures when said water is below its normal level.

4. In an automobile the combination with an engine, a water circulation system to cool the same, and an instrument board, of a container mounted in said circulation system and partially filled with a volatile fluid, a pressure gage mounted on said instrument board, and a conduit connecting said container and said gage to cause the expansion and contraction of said volatile fluid to be indicated on the latter, said container being arranged below the normal level of the water in said system whereby the actuating gage will indicate both the temperature of the water in said system when the water is at its normal level and the fall of the water below the level of said container.

5. An indicating device comprising a gage, a container for a volatile fluid, means for supporting said gage and said container, a conduit connecting said container with said gage whereby the volatilization of said fluid will actuate said gage, and an absorbent material in said container to absorb said fluid when in a liquid form and distribute the same over a large surface thereby exposing a large part of the fluid to the action of the heat and facilitating the vaporization thereof.

In testimony whereof, I affix my signature in presence of two witnesses.

MELROSE G. KOPF.

Witnesses:
F. W. SCHAEFER,
H. L. HAMMAKER.